(No Model.)
L. W. BUXTON.
KETTLE ATTACHMENT.
No. 432,017. Patented July 15, 1890.
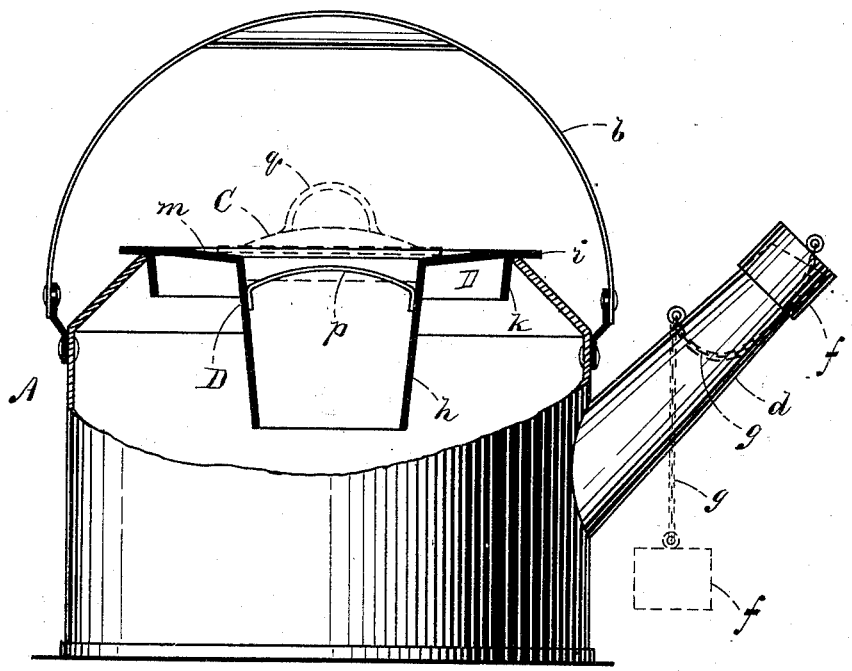
WITNESSES:
INVENTOR:
Levi W. Buxton,
PER C.A. Shaw & Lee,
ATTYS

UNITED STATES PATENT OFFICE.

LEVI W. BUXTON, OF NASHUA, NEW HAMPSHIRE.

KETTLE ATTACHMENT.

SPECIFICATION forming part of Letters Patent No. 432,017, dated July 15, 1890.

Application filed December 2, 1889. Serial No. 332,250. (No model.)

*To all whom it may concern:*

Be it known that I, LEVI W. BUXTON, of Nashua, in the county of Hillsborough, State of New Hampshire, have invented certain new and useful Improvements in Kettle Attachments, of which the following is a description sufficiently full, clear, and exact to enable any person skilled in the art or science to which said invention appertains to make and use the same, reference being had to the accompanying drawing, forming part of this specification.

The figure in the drawing is a side elevation of a tea-kettle provided with my improved kettle attachment, a portion of the body of the kettle being broken away to show the interior thereof.

My invention relates to an attachment for that class of kettles which are employed for heating water; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

In the drawing, A represents the body of the kettle, which is cylindrical in form and is provided with a handle $b$ and nose $d$. A cap $f$ is attached to the nose by a chain $g$, and is adapted to close the mouth thereof. The mouth of the kettle is enlarged to receive the attachment D. This attachment consists of an annular plate $i$ of larger diameter than the kettle-mouth, and a dependent cylinder $h$, extending downward from the inner edge of said plate. The plate $i$ partially closes the kettle-mouth, its outer edge projecting over the edge of said mouth. The plate is provided on its under side with an annular flange $k$, which fits into the kettle-mouth, preventing lateral movement of the attachment. The inner portion $m$ of the annular plate $i$ is concaved, whereby when a large vessel is disposed on said plate a space is formed between the bottom of said vessel and said plate, which permits the steam to come in contact with the greater part of the bottom of said vessel. A brace-rod $p$ extends across the interior of the body $h$ and serves as a handle for manipulating it.

A cover C, provided with a handle $q$, is fitted to close the mouth of the attachment.

The body $h$ is preferably constructed with downwardly-converging walls, as shown; but I do not confine myself to such construction.

In the use of this improved kettle attachment the kettle to which it is applied may be employed for all the ordinary uses of kettles of this description. When the attachment is applied to the kettle, the annular plate $i$ partially closes the kettle-mouth and the cylinder $h$ hangs within the kettle. When it is desired to steam articles of food, the cover C is removed from the top of the cylinder and the utensil containing the articles to be steamed is disposed on the annular plate $i$ over the top of said cylinder. The bottom of said cylinder being open and unobstructed, the steam or vapor from the water within the kettle, or within the cylinder in case the water-level is above the lower end of the cylinder, passes upward through said cylinder into or into contact with the utensil containing the articles to be steamed. The steam outside the cylinder, between it and the body of the kettle, constitutes a steam-jacket, which surrounds the cylinder and maintains an even temperature therein, preventing the condensation of the steam therein contained. Owing to this jacket, it is found in practical use of the attachment that the contents of various utensils disposed thereon are more rapidly heated than when said utensils are disposed over an ordinary kettle-mouth.

Having thus explained my invention, what I claim is—

1. A kettle attachment consisting of an annular plate provided with a flange adapted to fit within the kettle-mouth and a dependent cylinder extending downward from said annular plate, said cylinder being open and unobstructed at its lower end and adapted to form a steam-jacket between itself and the inner walls of the kettle when applied thereto, substantially as described.

2. The combination of a kettle and a kettle attachment consisting of an annular plate provided with a flange fitting within the mouth of the kettle and a dependent cylinder extending downward from said annular plate, said cylinder being open and unobstructed at its lower end and forming a steam-jacket between itself and the wall of the kettle, substantially as described.

LEVI W. BUXTON.

Witnesses:
JOHN H. VICKEY,
B. B. WHITTEMORE.